United States Patent [19]
Donato et al.

[11] Patent Number: 5,294,346
[45] Date of Patent: Mar. 15, 1994

[54] COMPOSITE MICROPOROUS MEMBRANES

[75] Inventors: Karen A. Donato, Gaithersburg, Md.; Lessie C. Phillips, Huntersville, N.C.

[73] Assignee: Hoechst Celanese Corporation, Somerville, N.J.

[21] Appl. No.: 999,622

[22] Filed: Dec. 31, 1992

Related U.S. Application Data

[63] Continuation-in-part of Ser. No. 955,561, Oct. 1, 1992.

[51] Int. Cl.$^5$ ............... A61K 9/00; A01N 25/12
[52] U.S. Cl. ........................... 210/645; 264/41; 424/448; 424/449; 514/929; 604/890.1
[58] Field of Search ............ 424/448, 449; 514/929; 604/890.1; 210/634, 644, 649–654, 645, 321.75, 321.84; 264/41, 45.1, DIG. 48, DIG. 62

[56] References Cited

U.S. PATENT DOCUMENTS 4,954,344 9/1990 Gale .................................. 424/448

Primary Examiner—Frank Sever
Attorney, Agent, or Firm—Philip P. McCann

[57] ABSTRACT

The composite membrane is disclosed having a microporous support which is coated with a polymer composition and a contact adhesive layer applied to said polymer. A process for making and a process for using the membrane is also disclosed.

24 Claims, No Drawings

5,294,346

COMPOSITE MICROPOROUS MEMBRANES

This application is a continuation-in-part of U.S. patent application Ser. No. 07/955,561 filed Oct. 1, 1992.

BACKGROUND OF THE INVENTION

1. Field of the Invention

The present invention relates to composite type membranes which may be used in various membrane processes including patches for drug delivery. The composite type membrane includes a microporous support which is coated with a polymer and a contact adhesive layer applied to the polymer. The present invention also relates to a method for making such membranes and using such membranes as patches to administer drugs.

2. Description of the Prior Art

Coated membranes and membrane processes are used widely in many fields of technology. These processes generally involve the permeation of gases or liquids through polymeric membranes wherein the membrane prevents hydrodynamic flow so that the transport therethrough is controlled by absorption or diffusion.

Membranes are typically selected on how they transport the fluids therethrough. The rate of transport through a membrane is a function of its permeability, generally referred to as flux. Liquid permeation, involves the permeation of feed components from the liquid phase on one side of the membrane to the liquid phase on the other side at a controlled rate.

As discussed, the selectivity of coated membranes is an important factor in the satisfactory operation of the membrane processes, which may include separation or delayed diffusion. In addition, membrane properties such as flux and resistance to chemical, biological and physical degradation also effect the efficiency of such processes.

There have been many efforts to develop composite membranes which function efficiently for specific processes. Typical of such efforts include the development of composite type membranes such as those disclosed in U.S. Pat. Nos. 4,242,159, 4,260,652, 4,277,344, and 4,388,189. These membranes include a microporous support having coated thereon a thin layer of polymeric material. However, previously known composite membranes have not been satisfactory especially for medical applications such as patches, since they can exhibit a variety of defects that affect flux and physical, chemical and biological degradation resistance and thus the overall efficiency of the membrane processes for which they are used.

In an effort to overcome the above described deficiencies in composite type membranes, there have recently been attempts to produce composite type membranes wherein the polymeric coating is a UV curable material. The basic UV curable formulation generally includes a UV reactive unsaturated polymeric material, a photocatalyst and a reactive diluent.

Japanese Kokai Patent No. Sho 59-76504(1984) describes a reverse osmosis membrane which is manufactured by impregnating a porous support with a mixture of monofunctional monomer and bifunctional monomer and irradiating the mixture with light to polymerize the monomers. U.S. Pat. No. 4,618,533 suggests the membrane coated with polymeric material may be cured using ultraviolet light. U.S. Pat. Nos. 4,976,897 and 5,102,552, which have been assigned to the assignee of the present invention, describes a composite membrane having a microporous support which is coated with a UV curable polymeric composition having a sufficiently high viscosity to prevent pore filling upon coating and curing. The UV curable resin coated composite membrane exhibited suitable resistance to physical, chemical and biological degradation while exhibiting adequate flux for specific uses.

Another approach to application of a coating to the microporous membrane is to change the surface of the hydrophobic microporous membrane to a hydrophilic one. This is especially true when polyolefinic films, a preferred type of polymeric material often employed in the manufacture of microporous membranes, are employed. Because these films are not "wetted" with water and most aqueous solutions, they could not be used advantageously in various applications. Such proposals have been put forth in the past to overcome these problems, such as exemplified by U.S. Pat. Nos. 3,853,601; 3,231,530; 3,215,486 and Canadian Patent No. 981,991 which utilize a variety of hydrophilic coating agents or impregnants. Such coating agents or impregnants, although effective for a limited period of time, tend to be removed in a relatively short period of time by solutions which contact the membrane.

Others have attempted to impart hydrophilic character to a normally hydrophobic microporous membrane by the use of low energy plasma treatments. Such plasma treatments are achieved by first activating surface sites of the microporous membrane using argon or hydrogen plasma and then grafting thereto an appropriate free radical polymerizing species such as acrylic acid. Such plasma treatments result in a film having only a surface which is wettable. The surface of the membrane also becomes plugged when wet, which then inhibits or prevents the free flow of water through the interior of the membrane. The unavoidable plugging of the pores renders the membrane unsuitable for certain applications.

Surface modification treatments such as corona treatment is used with microporous membranes for adhesiveness and permeability. For example, U.S. Pat. No. 5,085,775 discloses corona treatment of microporous backing material to improve or increase the adhesion to the microporous polysulfone support. U.S. Pat. No. 5,013,439 discloses corona treatment of microporous polymer film to render the films permeable.

Coating polymeric materials on the porous supports followed by curing has generally been found to result in membranes having low flux. The conventional wisdom is that such coatings tend to wick up and fill the pores of the microporous support, thereby producing a membrane having an insufficient flux.

This failure is unfortunate since such polymeric systems have the potential to be tremendously advantageous in the area of medical applications such as administering drugs, since a wide range of chemical and mechanical properties may be built into the polymeric systems, thereby producing membranes having improved resistance to chemical, physical and biological degradation. Also, the simplicity of these systems compared to conventional systems is potentially appealing, in that they involve solventless processes.

Composite membranes such as bandages that administer drugs to the skin have been known for some time. U.S. Pat. No. 3,249,109 discloses a two layer topical dressing including an adhesive base layer made of hydrated gelatin and drug, and a fabric backing layer.

Such bandages typically release drug at either unpredictable or inconsistent rates.

In the early 1970s, patents relating to bandages that release drugs at a substantially constant rate began to appear. U.S. Pat. No. 3,598,122 discloses a multilayer bandage including a backing layer, a drug reservoir layer and a contact adhesive layer by which the bandage is stuck to the skin. The rate of drug release depends on the rate at which the drug diffuses through the wall surrounding the core. U.S. Patent 3,797,494 discloses a substantially constant release bandage having a backing layer, a drug reservoir layer, a drug release rate controlling microporous membrane layer, and a contact adhesive layer. The rate of drug release from the bandage depends on the rate at which drug diffuses through the microporous membrane. However, such a bandage typically releases the drug immediately upon activation.

The development of a useful polymeric and adhesive coated composite membrane for application of membrane process to impart specific flux control to the membrane would therefore be extremely important and a desirable development.

SUMMARY AND OBJECTS OF THE INVENTION

In view of the foregoing limitations and shortcomings of prior art composite membranes and the need in the art for improved composite membranes which may be used in liquid delayed processes, it is therefore a primary objective of the present invention to fulfill the need by providing a polymer coated composite membrane including a contact adhesive layer for use in membrane processes.

It is another object of the invention to provide a surface treated polymer coated composite membrane which exhibits suitable resistance to physical, chemical and biological degradation while exhibiting adequate or desired flux and diffusion rates.

It is yet another object of the present invention to provide a process for producing a adhesive and polymer coated composite membrane wherein the wicking of the coating and adhesive by the pores of the microporous support is avoided.

In one aspect, the present invention provides a composite type membrane, including a microporous support with coating thereon and a contact adhesive layer applied to the coating. It has been found that said composite type membrane may be produced which has substantially no pore fill, which minimizes the problems associated with wicking experienced by prior art composite membranes. This allows for production of membranes having suitable flux and diffusion, and resistant to physical, chemical and biological degradation.

In another aspect, the present invention relates to a process of producing such a membrane. The process includes coating the microporous support with the polymer and applying a contact adhesive layer to the polymer. In yet another aspect, the present invention relates to the use of the membranes in a diffusion controlled process for use in fluid controlled diffusion membranes.

With the foregoing and other objects, advantages and features of the invention that will become hereinafter apparent, the nature of the invention may be more clearly understood by reference to the following detailed description of the invention and the appended claims.

DETAILED DESCRIPTION OF THE INVENTION

As mentioned hereinabove, the composite type membrane of the present invention includes a microporous support, commonly known as a microporous polymer, which is coated with a polymer coating and a contact adhesive layer applied to the polymer coating.

The membrane support may be any of those specifically used in the art. For example, polyolefin supports such as those formed from polyethylene, polypropylene and polymethylpentene, polystyrene, or substituted polystyrene supports, fluorinated polymer supports such as those formed from polytetrafluoro ethylene, polysulfone supports, polyester supports such as those formed from polyethylene terephthalate and polybutylene terephthalate, polyacrylate and polycarbonate supports, and supports formed from vinyl polymers such as polyvinyl chloride and polyacrylonitriles may be used in the present invention.

The pore support should generally have an average pore width between about 0.005 and about 0.06 microns and preferably between about 0.02 and about 0.05 microns; an average pore length of from about 0.1 to about 0.25 microns; and a resistance to air flow (average) of from 10 to about 100 Gurley second, preferably from about 25 to about 60 Gurley second as measured by the test method ASTM-726(B). Of course, the materials and processes of a particular support may vary according to its ultimate end-use in a particular separation process.

Microporous membranes can be classified into two general types: one type in which the pores are interconnected i.e., a closed-cell membrane, and the other type in which the pores are essentially interconnected through passages which may extend from one exterior surface or surface region to another, i.e., an open-celled membrane. The preferred microporous membrane of the present invention are of the latter type.

Membranes possessing this microporous structure are described, for example, in U.S. Pat. Nos. 3,426,754 and 3,853,601, which patent is assigned to the assignee of the present invention. This preferred method of preparation described therein involves drawing or stretching at ambient temperatures, i.e., cold drawing, a crystalline elastic starting film in an amount of about 10 to 300% of its original length, with subsequent stabilization by heat-setting of the drawn film under a tension such that the film is not free to shrink, or can shrink only to a limited extent generally less than 5%. Such membranes are commercially available from Hoechst Celanese Corporation under the Celgard ® trademark.

Polymers found suitable for preparing composite type membranes of the present invention include polyethylene oxide having a molecular weight from 1 million to about 8 million; polyacrylic acid having a molecular weight of about 750,000; poly(methyl methacrylate) having a molecular weight of about 120,000; polyacrylamide having a molecular weight from about 5 million to about 6 million, and polycarbonate and polyether polyurethanes.

Sufficient water is used to disperse the polyurethane in an aqueous solution at a dispersion viscosity in the range of 40–1,000 centipoise. Viscosity may be adjusted in accordance with the particular impregnation properties desired and by the particular dispersion composition which are all dictated by the final product characteristics. It should be noted that no emulsifiers or thickeners are required for the stability of the dispersions.

Those of ordinary skill in the art recognize ways to modify the primary polyurethane dispersion according to end product uses, for example, by the addition of coloring agents, compatible vinyl polymer dispersions, ultraviolet filtering compounds, stabilizers against oxidation and the like.

Polycarbonate polyurethanes suitable for this invention are commercially available including Bayhydrol 121 and Bayhydrol 123 from Miles Inc., Solucote 85-260 and Solucote 89-86 from Soluol Chemical Co. and NeoRez TXR-9603 from ICI Resins US.

A contact adhesive layer is overlaid onto the polymer coating to facilitate bonding of the composite type membrane to other components or to skin. Preferred adhesives for the contact adhesive layer include emulsions of acrylate copolymers. These adhesives are commercially available from Air Products and Chemicals, Inc. under the tradename Flexcryl ®. Of these, Flexcryl ® 1625 emulsions has been found to be particularly useful as an adhesive agent for the contact adhesive layer.

As discussed previously, it has been found that the composite type membrane of the present invention may be produced which exhibits substantially no pore filling and thereby minimizes the problems associated with pore filling affecting diffusion of a liquid across the coated membrane. Although the inventors do not wish to be held by any one theory to explain this phenomena, it is believed that, the use of the polymer coating and contact adhesive allows for a sufficient time to complete coating and drying before any significant pore filling of the pore support occurs. In addition, it has been surprisingly found that while pore filling is minimized, adequate bonding between the porous support and the polymer coating is maintained.

The process of the present invention is intended to cover those situations in which the microporous support is produced and, in some situations, the surface may be modified to make it hydrophilic. It has been found that when using the polyurethane the surface may be made hydrophilic. Conventional surface modification techniques are well known. Corona treatment is very common and in the present invention, the preferred procedure for modifying the surface thereof when using polyurethane as the coating. The corona treatment, or other surface modifications should be sufficient to allow uniform application of the polyurethane to the microporous support.

The composite type membrane of the present invention may be prepared using conventional methods well known in the art. The microporous support structure may be coated with a suitable polymer set forth herein using coating methods well known in the art. Specific examples of known coating methods include two and three roll pressure coating, two and three roll reverse coating, knife coating or wire bar coating, dip coating, one and two roll kiss coating, gravure coating and nip coating. The microporous support is typically coated with the polymer once, although multiple coatings may be applied. Preferably the coating and the adhesive are applied to both sides of the microporous membrane. The adhesive may be applied in the same or different manner as the coating.

Due to the potential advantages and areas of flexibility of chemical composition, ease of construction, coating thickness and flux, the composite type membranes of the present invention may be used in a variety of different membrane processes. For example, the coated membranes may be used for separation processes as well as diffusion control processes. For example, the membrane may be used for the efficient transfer of liquids across the coated membrane for diffusion control processes.

The present invention is further illustrated by the following examples. These examples however, should not be construed as in any way, limiting the present invention. All parts and percentages in the examples in the remainder of the specification are by weight unless otherwise specified.

EXAMPLE

Various composite type membranes were constructed according to the present invention. Each of the composite type membranes included a Celgard 2400 microporous membrane coated with a polymer coating as designated in Table 1.

TABLE 1

| Examples | Coating |
|---|---|
| 1 | Polycarbonate Polyurethane |
| 2 | Polyether Polyurethane |
| 3 | Polyethylene oxide (MW 1,000,000) |
| 4 | Polyethylene oxide (MW 8,000,000) |

In Examples 1 and 2 the Celgard ® 2400 microporous membrane was corona treated to make a hydrophilic surface. Then the polyurethane was coated onto each surface of the membrane followed by 5 mils of the Flexcryl 1625 adhesive and a release liner over the adhesive.

In the case of Examples 3 and 4, the microporous membrane was not corona treated. The polyethylene oxide was coated followed by 5 mils of the adhesive and a release liner over the adhesive.

Each example was subjected to a flow path of 10% nitroglycerin by weight in propylene glycol. The receiver solution contained deionized water. The diffusion studies were done in Franz diffusion cells with analysis of nitroglycerin content by HPLC. Average and cumulative flux across the membrane was measured and found acceptable.

Although only preferred embodiments of the invention are specifically illustrated and described above, it will be appreciated that many modifications and variations of the present invention are possible in light of the above teachings, and within the purview of the amended claims without departing from the spirit and intentions within the scope of the invention.

We claim:

1. An adhesive and polymer coated microporous membrane comprising a microporous support characterized by having a crystallinity of at least 40%, an average pore width of from about 0.005 to about 0.6 microns, a void volume from about 30% to about 50%; said microporous polymeric film coated on at least one side with a polymer coating, and a contact adhesive layer; said coating being designed to substantially preclude filling of the pores of said membrane by said adhesive.

2. An adhesive and polymer coated microporous membrane of claim 1 wherein said polymer coating is selected from the group consisting of polycarbonate polyurethane, polyether polyurethane, polyethylene oxide, polyacrylic acid, poly(methyl methacrylate) and polyacrylamide.

3. An adhesive and polymer coated microporous membrane of claim 1 wherein said polymeric coating is a polycarbonate polyurethane or a polyether polyurethane.

4. An adhesive and polymer coated microporous membrane of claim 3 wherein said microporous support is surface modified by corona treatment.

5. An adhesive and polymer coated microporous membrane of claim 1 having an average pore length of from about 0.1 to about 0.25 microns.

6. An adhesive and polymer coated microporous membrane of claim 1 wherein said polymer is a polyethylene oxide.

7. An adhesive and polymer coated microporous membrane of claim 1 wherein said adhesive layer is an acrylate ester polymer.

8. A composite membrane having reduced pore filling comprising a microporous support, a polymer coating coated thereon, and a contact adhesive layer adjacent said coating on at least one side that is permeable to a drug; said coating being designed to substantially preclude filling of the pores of said membrane by said adhesive.

9. A composite membrane according to claim 8 wherein the microporous support is selected from the group consisting of polyolefin supports, polystyrene supports, substituted polystyrene supports, fluorinated polymer supports, polysulfone supports, polyester supports, polyacrylate supports, polycarbonate supports and vinyl polymer supports.

10. A composite membrane according to claim 8 wherein the support has an average pore width of from about 0.005 to about 0.06 microns.

11. A composite membrane according to claim 10 wherein the support has an average pore length of from about 0.10 to about 0.25 microns.

12. A composite membrane according to claim 8 wherein said polymer coating is selected from the group consisting of polycarbonate polyurethane, polyether polyurethane, polyethylene oxide, polyacrylic acid, poly(methyl methacrylate) and polyacrylamide.

13. A composite membrane according to claim 12 wherein said polymer coating is a polycarbonate or a polyether polyurethane.

14. A composite membrane according to claim 13 wherein said contact adhesive layer is an acrylate ester polymer.

15. An improved membrane delay process comprising the steps of (i) feeding a fluid to be delayed into a membrane containing apparatus and (ii) delaying the passage of the fluid across the membrane, the improvement comprising the use of a composite membrane having reduced pore filling, said membrane comprising a microporous support, a polymer coating and a contact adhesive layer adjacent said coating on at least one side that is permeable to said fluid; said coating being designed to substantially preclude filling of the pores of said membrane by said adhesive.

16. A membrane delay process according to claim 15 wherein the support is open-celled and has an average pore width of from about 0.005 to about 0.06 microns.

17. A membrane delay process according to claim 15 wherein the support has an average pore length of from about 0.1 to 0.25 microns.

18. A membrane delay process according to claim 15 wherein said polymer coating is selected from the group consisting of polycarbonate polyurethane, polyether polyurethanes, polyether oxide, polyacrylic acid, poly(methyl methacrylate) and polyacrylamide.

19. A membrane delay process according to claim 18 wherein said contact adhesive layer is an acrylate ester polymer.

20. A process for making a composite membrane having reduced pore filling and suitable for use in fluid delay process comprising (i) coating a microporous support with coating polymer and (ii) coating said polymer with a contact adhesive layer; said coating being designed to substantially preclude filling of the pores of said membrane by said adhesive.

21. A process according to claim 20 wherein the microporous support is selected from the group of polyolefin supports, polystyrene supports, substituted polystyrene supports, fluorinated polymer supports, polysulfone supports, polyester supports, polyacrylate supports, polycarbonate supports and vinyl polymer supports and has an average pore width of from about 0.005 to about 0.06 microns.

22. A process according to claim 21 wherein the support has an average pore length of from about 0.1 to about 0.25 microns.

23. The process according to claim 21 wherein said polymer is selected from the group consisting of polycarbonate polyurethane, polyether polyurethanes, polyethylene oxide, polyacrylic acid, poly(methyl methacrylate) and polyacrylamide.

24. The process according to claim 21 wherein said contact adhesive layer is an acrylate ester polymer.

* * * * *